Figure 1:
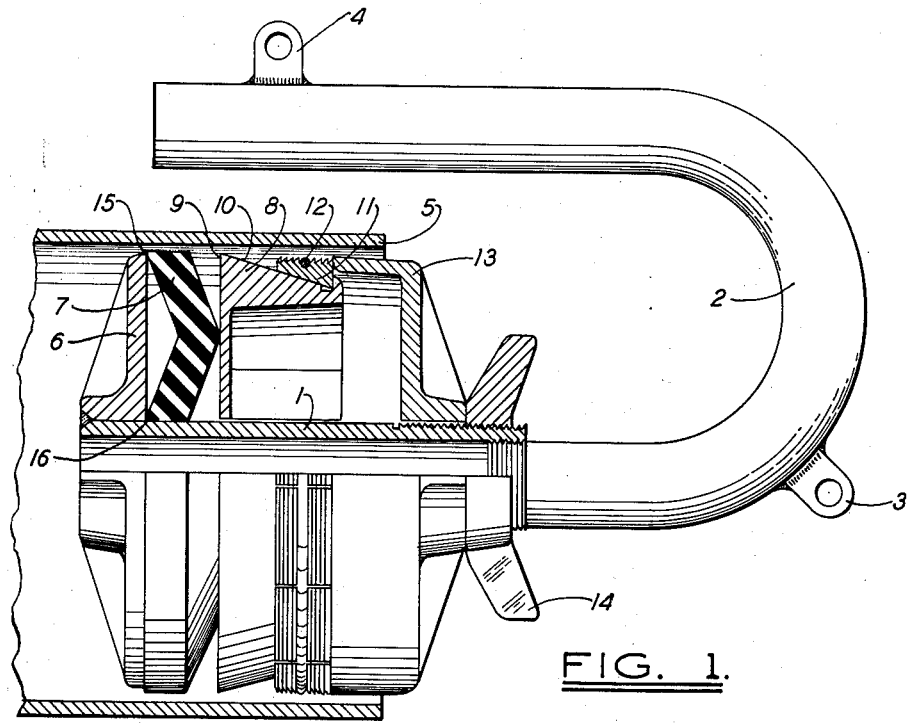

March 14, 1961 — B. VER NOOY — 2,974,685
PIPE PLUG
Filed Aug. 23, 1957

BURTON VER NOOY
INVENTOR

BY Browning, Simms & Hyer

ATTORNEYS

United States Patent Office 2,974,685
Patented Mar. 14, 1961

2,974,685
PIPE PLUG

Burton Ver Nooy, Tulsa, Okla., assignor to T. D. Williamson, Inc., Tulsa, Okla.

Filed Aug. 23, 1957, Ser. No. 679,894

9 Claims. (Cl. 138—90)

This invention relates to improvements in pipe plugs of the type which are insertable into the end of a pipe.

In pipe plugs for the larger sizes of pipe (e.g. 12 inch) and particularly at higher pressures, one major problem has been to provide a flexible, easy to manipulate arrangement for sealing and locking the plug in the end of the pipe. The arrangement should accommodate a considerable variation in pipe diameters. Thus the plug should be usable to plug a selected minimum diameter pipe and yet be expansible for use in a selected maximum diameter pipe so that a single plug can be used for pipes between these minimum and maximum diameters. Since such expansion between various diameters is usually accomplished manually, it must be easy to do. Thus, the seal should be expansible by a relatively small force into initial contact with the pipe wall and yet it must be ultimately forced into contact sufficiently tightly to seal against high pressures. Further, the seal should be positive in operation so that each time the plug is placed in a pipe, the seal will be effective to hold against high high pressures without being displaced from sealing position.

Such a desirable seal arrangement should also cooperate with a locking arrangement to effectively lock the plug in place. Thus the locking arrangement should be equally as easy to use as the seal and should complement and supplement the same so that the plug is operable as a unit to accomplish its intended function in a simple, positive and reliable manner.

A principal object of the invention is to provide a pipe plug having a seal requiring a relatively small force to expand it to form an initial seal with a pipe wall even though the seal must be so expanded a considerable distance to accommodate a larger pipe diameter and yet which is mechanically confined so that very large forces can be applied to seal against relatively high pressures without danger the seal will fail.

Another object is to provide a pipe plug which has a seal body of resilient material shaped to be readily deformed by manually manipulated parts of the plug so as to radially expand until sealing engagement is made with the pipe wall. Subsequently, fluid pressure placed in the pipe is directed to develop a force across substantially the entire cross-section area of the pipe to mechanically extrude the deformed seal body into a progressively efficient sealing engagement with the pipe wall, the seal body being mechanically confined so that it can extrude only in the direction of the pipe wall.

Another object is to provide a pipe plug with a seal body and locking structure which are radially expanded simultaneously by manually manipulated parts of the plug into initial sealing and locking relations with the pipe. The seal body is deformed to radially expand to seal the pipe and the locking structure is expanded to couple to the pipe with substantial uniformity. Fluid pressure across substantially the complete cross-section of the pipe is then applied to simultaneously and progressively increase the effectiveness of the sealing and locking function of the plug structure.

Figure 2:
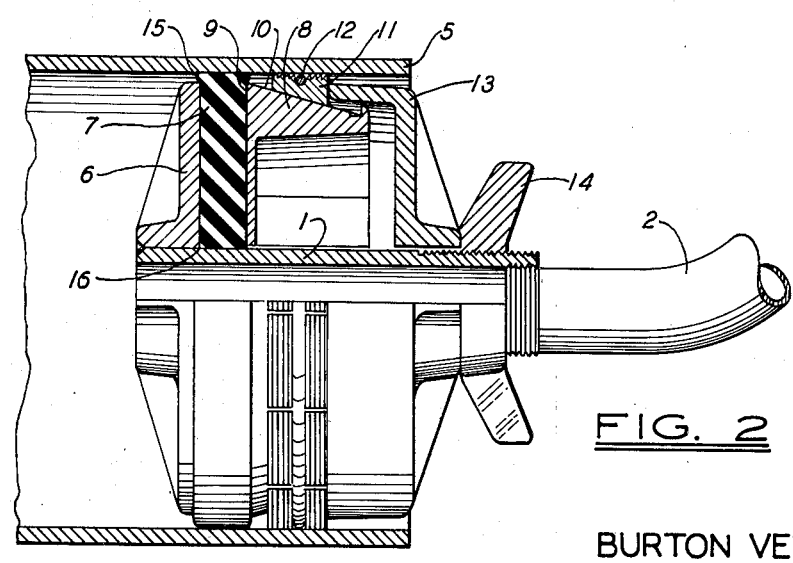

Other objects, advantages and features of this invention will be apparent to one skilled in the art upon consideration of the written specification, appended claims and attached drawings, wherein:

Fig. 1 is a view, in partial section, showing a preferred form of plug as inserted into the pipe ready to be sealed and locked in position; and Fig. 2 is a view similar to Fig. 1 showing the plug in expanded position within the pipe.

In accordance with this invention, the pipe plug is provided with a resilient seal disposed in a recess in the plug body. The seal and recess are shaped in cross-section relative to each other so that as the cross-section of the recess is reduced in size, the seal is first mechanically deformed, as by bending, to expand it radially. This deformation requires relatively little force so that the seal can be easily expanded a considerable radial distance into initial sealing engagement with the pipes of varying diameters. As the recess continues to reduce in size, preferably by applying pressure in the pipe sealed against by the plug, it will eventually mechanically confine the seal on all sides except that side which is confined by the pipe. Then as fluid pressure continues to increase, the seal will be extruded radially in order to increase the effectiveness of its seal with the pipe.

This type of sealing arrangement is preferably combined with an expansible locking arrangement in a manner such that force applied to expand the seal also expands the locking mechanism.

The preferred embodiment of the invention is illustrated as having a central shaft 1 which is preferably tubular and provided with both internal and external threads on one end. A U-shaped lifter pipe 2, with legs of unequal length, has male threads on the shorter leg which can be engaged with the internal threads of shaft 1. The longer of the legs of shaft 2 curves back over the body of the plug on the shaft 1. Lifting eye pieces 3 and 4 are welded to the pipe 2.

Lifter pipe 2 has the main purpose of providing a means, whereby the plug structure can be suspended, as from a gin pole truck, either a vertical or horizontal position. Lifting eyepiece 3 is aligned with the longitudinal axis of the plug so that the plug may hang vertically. Lifting eye piece 4 is positioned in the radial plane through the center of gravity of the plug body proper so that when suspended by it, the plug will be in a horizontal position. A crane, etc. can carry the plug to the pipe to be tested and insert the plug from either the horizontal or vertical position as required by the position of the pipe plugged. Pipe 2 can also be used to introduce fluid pressure into pipe 5 for the various purposes previously mentioned. A source of pressure is not shown, but any source could be readily attached by various means to the end of the longer leg of pipe 2. It is more conventional to attach the source directly to the central shaft of plugs of this type, but it is feasible to utilize pipe 2 if it is hollow and properly fitted for attachment to the source.

The device illustrated may be used solely as a plug. Shaft 1 could be plugged or made solid. In either arrangement whether the test pressure is inserted through the plug, as a test head, or is brought into the pipe through other structure, this preferred embodiment of the invention functions to carry out the objects of the invention.

Turning to a consideration of the plug structure, shaft 1 is preferably a single central shaft but can be in the form of a plurality of shafts. Regardless of the form of this support, the plug may be generally considered as having a locking section with which to fix the position of the plug wth respect to the pipe wall and a sealing section with which to prevent fluid within pipe 5 from escaping.

Both the sealing section and the locking section of the preferred embodiment are expansible. However, the locking section may take many other forms and many of the objects of the invention will be carried out. Functionally, the locking section of the plug fixes the location of the plug within the pipe. The specific form of structure shown with which to carry out this function is not to be taken as limiting. It is merely one aspect of this invention that both the sealing and locking sections of the plug are simultaneously actuated to carry out their respective functions.

A first flange, or body, 6 is shown as fixed to the end of shaft 1. Seal body 7 is shown, in cross section, as having the so-called chevron shape. Expander body 8 provides flange surface 9 to cooperate with the opposed surface of flange 6 in forming the recess about shaft 1 in which seal body 7 is arranged. These surfaces are normal to the axis of shaft 1 but, as indicated below, may be given other shapes to extend the seal body 7 radially as they compress and deform the seal body.

Expander body 8 is also formed with a conical frustum to provide an external surface 10 which tapers toward the shaft from the periphery of flange surface 9. A series of toothed segments 11 are held on surface 9 by a suitable retainer, such as garter spring 12. A collar member 13 is provided to slide the segments 11 up the tapered surface 10 against the resistance of retainer 12. This cooperation provides the expansion, relative to the plug axis, of this specific form of locking section. Nut 14 is threaded on the end of the shaft 1 away from flange 6 and manual manipulation of this nut 14 initially brings all of the elements of the plug together in initiating their functions of sealing and locking.

Again it is pointed out that not only are there other forms of locking structure which can be used to fix the plug axially within the pipe 5, but there are other forms for each of the elements of the locking section illustrated in this embodiment which are feasible. There are several forms for retainer 12 which are practical. A coiled spring form is illustrated in the drawing, but some form of snap ring, or a rubber band are practical examples of other forms for this structure. Also the shoe segments may take forms other than illustrated and they may have a locking surface with which to engage the pipe wall other than the specific form of teeth used in this embodiment.

One preferred way of forming the shoe segments 11 is to select a continuous metallic ring, having an external diameter approximately equal to the internal diameter of that pipe for which the plug is primarily designed for use. The saw toothed profile for the teeth is obtained by cutting continuous adjacent grooves in the ring. A groove in the center is formed to receive the particular shape of the garter spring. The ring is then sliced into a number of segments. One or more segments are then removed and the remaining segments placed end to end on the periphery of the surface 10. However, the ring can be continuous except split longitudinally at one point or it can be continuous and split at one point and partially split at others.

A small retaining ridge is formed on the bottom of inclined surface 10 so that the shoe segments will be limited in the distance they will slide down surface 10 when not held by collar 13. From this position, the shoes are advanced up the incline of surface 10, moving radially from the axis of the plug. This radial movement toward the pipe wall, by each shoe, is an expansion of the shoes as a combination. This expansion continues until the teeth of the segments bite into the material of the pipe wall.

The basic requirements for collar, back-up plate 13 are apparent from the drawing. The lip of the cup shape of this member bearing against shoes 11 must be deep enough to extend over the small end of expander 8 and slide shoes 11 up surface 10 far enough for the teeth of the shoes to engage the wall of the largest size of pipe to be plugged.

The overall purpose of the sealing section is to properly manipulate the seal body 7 into operative position between the plug and pipe wall. The material of seal body 7 is preferably of resilient, deformable rubber-like material which can be molded or otherwise shaped into a disc form having a desired cross-sectional shape and compressed between the flanges 6 and 9 to extend radially from the plug into sealing relation with the pipe wall.

It will be understood that the illustrated chevron form (V-shaped cross-section) for seal body 7 is not the only form the seal today can take. Thus the principal requirement is that the cross-sectional shapes of the seal and the recess in which it resides be such that upon decreasing the cross-sectional area of the recess, the seal is deformed, as distinguished from extruded, so that it expands radially. The seal preferably should further have a shape such that it is inclined and seals against the outer periphery of flange 6 during its deformation. In some instances, the nut 14 may not be tightened sufficiently to deform the seal until it entirely fills the recess. In such case, the sealing contact with the periphery of flange 6 prevents pressure fluid from flowing into the recess between seal body 7 and flange 6 to equalize the pressure across the flange. By preventing such equalization, the pipe pressure is made effective across the entire front surface of flange 6 to develop a force for further expanding both the seal body and locking means.

Since flange 6 is sealed to shaft 1, as by welding, there may be some tendency for the seal to stick to flange 6 when it is to pass from its Fig. 2 to its Fig. 1 position. To avoid this, a longitudinally extending notch can be cut at inner edge 16 of the seal so that fluid can flow from the rear of the seal to the space between the seal and flange 6 to break the suction which may develop as the seal moves from its Fig. 2 to its Fig. 1 position.

With the above in mind, it will be understood that the illustrated chevron shaped seal body 7 is not the only form the seal body can take. The chevron shape is the preferred one because it is simple, practical and easy to fabricate. However, the seal body can take, in radial cross-section, a serpentine, zig-zag, arcuate or other non-planar forms. Also the radial cross-sectional shape of the recess can be other than rectangular. It can have curved, etc. walls. Of course, the seal body and recess cross-sectional shapes must be related to each other such that the seal body is deformed, rather than extruded, during at least its initial radial expansion toward the pipe wall. The relation is further such that after the seal body has been so deformed, it fills the recess and is extruded even more tightly against the pipe wall.

The manual manipulation of nut 14 previously described expanding as the locking section. Now it is pointed out that this advancement of nut 14 also brings the first flange 6 toward surface 9 to compress body 7 in deforming it to extend it radially from the recess these flanges form about shaft 1 until the pipe wall is contacted. This simultaneous actuation of both sections of the plug structure by nut 14 makes the two sections of this plug a functional unit.

It has been pointed out that deformation of body 7, having the preferred chevron cross-section shape, extends the seal radially. The outer edge of this form of the seal body is made parallel to the surface it seals. This provision results in the edge acting as lip 15 against pipe 5. In this form, the seal body also contacts the outer periphery of the flange 6. Accordingly, even though the seal is only partially deformed and only partially fills the recess when pressure is applied to the pipe, it will prevent pressure equalization across flange 6. Fluid pressure in pipe 5 will energize lip portion 15 and make its seal progressively efficient. The fluid pressure force, acting over substantially the entire cross-section area of pipe 5, continuous to compress seal body 7 until the body is extruded into assuming the shape of the recess and "bloomed" between the plug periphery and pipe wall.

Fig. 2 illustrates the seal body 7 completely filling its recess and extending radially the distance necessary to engage the pipe plugged. Solid rubber bodies are substantially incompressible. Therefore, the fluid pressure of the pipe 5 flows the rubber seal 7, extruding it against the pipe wall and forming a bulge, or bloom, of a size dependent upon the magnitude of the fluid pressure.

Therefore, the higher the fluid pressure in pipe 5, the tighter this seal between body 7 and the pipe wall is made by extrusion of the body extended to the wall by deformation.

The central opening through the flange 6, provided by shaft 1 subtracts very little from the area available to the fluid pressure in pipe 5 in developing the force to form the seal of Fig. 2. Therefore, practically the entire area of the flange, or substantially the entire cross-section of the pipe, is available to develop this force transmitted through the seal section to the locking section to make the functions of both these sections progressively efficient.

In this connection, the seal body should have a thickness such that when compressed to the Fig. 2 position, the area of the seal in contact with the pipe is sufficiently smaller than the cross-sectional area of the pipe and, preferably, smaller than the effective endwise area of flange 6, that the unit pressure of the seal against the pipe exceeds the unit pressure of the fluid sealed against. This prevents leakage even if lip 15 is disregarded. Thus the sealing section can be termed a multiple area seal.

Where it is desired that the seal and locking mechanisms extend a considerable distance into the pipe, shaft 1 can be lengthened rearwardly and a sleeve provided around such length to afford a stress transmitting connection between nut 14 and collar member 13. The sleeve can be connected to the collar member if desired. Then the nut will extend from the end of the pipe for easy manipulation while the seal and locking mechanism can be positioned any desired length from the end. This is desirable when welding a T, flange or other fitting to the open pipe end.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe plug, comprising a shaft adapted to be inserted into the end of a pipe, a first flange fixed to the shaft, a second flange carried by the shaft for free reciprocation longitudinally thereof, a seal ring of resilient material having a substantially chevron-shaped radial cross-section when unstressed and surrounding the shaft intermediate the flanges with its inner and outer edges pointing toward the inserted end of the shaft, means for moving the flanges relatively toward one another to bend the seal ring into a shape in which its outer edge extends radially outwardly into engagement with the pipe to form a fluid barrier between the shaft and pipe and then confine the seal ring between the flanges, and means for locking one of the flanges against longitudinal movement with respect to the pipe, whereby fluid pressure within the pipe is effective across the barrier.

2. A pipe plug of the character defined in claim 1, wherein the inner edge of the seal ring closely surrounds the shaft, and the outer edge of the flange on the concave side of the ring bears against it inwardly of the outer edge thereof.

3. A pipe plug of the character defined in claim 2, wherein the inner and outer edges of the seal ring have lips to form pressure energized seals with the pipe.

4. A pipe plug of the character defined in claim 1, wherein the area of the outer edge of the seal ring engageable with the pipe is less than that of the fluid barrier.

5. A pipe plug comprising a shaft adapted to be inserted into the end of a pipe; a first flange fixed to the shaft; a second flange carried by the shaft and freely movable toward and away from the first flange; a seal ring of resilient material surrounding the shaft intermediate the flanges, said seal ring being disc shape and of uniform thickness, having a non-planar cross-section when unstressed and having its outer edge inclined against and sealing with the outer periphery of the innermost of the flanges; means for moving said flanges relatively toward one another to deform the seal ring and extend the outer edge of the seal ring radially outward into engagement with the pipe to form a fluid barrier between the shaft and pipe and confine the ring between the flanges; and means for locking one of the flanges with respect to the pipe to permit pressure from fluid within the pipe to be effective across the barrier.

6. A pipe plug of the character defined in claim 5 wherein the shaft is hollow and a substantially U-shaped arm is attached to the shaft extending away from and curving toward the inserted end of the body; and a pair of lifting eye lugs on the arm are aligned with a longitudinal axis of the body, said pair of lifting eye lugs being singly disposed with one lying upon the central axis of the body extended, and the other lying in a plane normal to said central axis passing through the center of gravity of the body.

7. A pipe plug comprising a shaft adapted to be inserted into the end of a pipe; a first flange fixed to the shaft; a second flange freely longitudinally reciprocable on the shaft in spaced relation to the first flange, said flanges having sufficient width to substantially confine a later mentioned seal ring between them; a seal ring of resilient material surrounding the shaft between the flanges, said seal ring being disc shaped and of uniform thickness, having a non-planar cross-section when unstressed and having its outer edge inclined against the outer periphery of said first flange; mechanical means for moving the flanges relatively toward one another thereby flattening said seal ring and extending its outer edge radially outward into engagement with the pipe to form a fluid barrier between the shaft and pipe while substantially confining the seal ring between the flanges; and means for locking one of the flanges with respect to the pipe so that pressure of fluid within the pipe is effective across the barrier to move the flanges closer together, increasing outward pressure on said seal ring.

8. A pipe plug of the character dened in claim 7 wherein the area of the outer edge of the seal ring engaging the pipe is substantially less than the area of the flange actuated by pressure from fluid within the pipe.

9. A pipe plug of the character defined in claim 7 wherein the first flange is attached to the end of the shaft first inserted into the pipe; and the area of the outer edge of the seal ring engaging the pipe is less than the area of said first flange.

References Cited in the file of this patent

UNITED STATES PATENTS

| | | |
|---|---|---|
| 1,808,411 | Hinkston | June 2, 1931 |
| 2,607,370 | Anderson | Aug. 19, 1952 |
| 2,763,293 | Kruck | Sept. 18, 1956 |
| 2,867,243 | Bowan | Jan. 6, 1959 |
| 2,886,067 | Maxwell et al. | May 12, 1959 |